United States Patent
Jiang et al.

(10) Patent No.: US 10,345,524 B2
(45) Date of Patent: Jul. 9, 2019

(54) OPTICAL EDGE COUPLER WITH CONTROLLABLE MODE FIELD FOR PHOTONIC CHIP

(71) Applicants: Jia Jiang, Kanata (CA); Eric Bernier, Kanata (CA)

(72) Inventors: Jia Jiang, Kanata (CA); Eric Bernier, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 15/388,861

(22) Filed: Dec. 22, 2016

(65) Prior Publication Data

US 2018/0180818 A1 Jun. 28, 2018

(51) Int. Cl.
*G02B 6/30* (2006.01)
*G02B 6/122* (2006.01)
*G02B 6/14* (2006.01)

(52) U.S. Cl.
CPC ............ *G02B 6/305* (2013.01); *G02B 6/1228* (2013.01); *G02B 6/14* (2013.01)

(58) Field of Classification Search
CPC ......... G02B 6/305; G02B 6/1228; G02B 6/14
See application file for complete search history.

(56) References Cited

U.S. PATENT DOCUMENTS

| 7,076,135 B2 * | 7/2006 | Yamada | ............... G02B 6/1228 385/129 |
|---|---|---|---|
| 7,643,710 B1 | 1/2010 | Liu | |
| 2004/0037497 A1 * | 2/2004 | Lee | ...................... G02B 6/1228 385/28 |
| 2004/0057667 A1 | 3/2004 | Yamada et al. | |
| 2005/0123244 A1 | 6/2005 | Block et al. | |

(Continued)

FOREIGN PATENT DOCUMENTS

| CN | 1495447 A | 5/2004 |
| CN | 102159975 A | 8/2011 |
| CN | 104391354 A | 3/2015 |

OTHER PUBLICATIONS

Kopp, et al., "Silicon Photonic Circuits: On-CMOS Integration: Fiber Optical Coupling, and Packaging", IEEE Journal of Selected Topics in Quantum Electronics, vol. 17(3), May/Jun. 2011.

(Continued)

*Primary Examiner* — John Bedtelyon

(57) ABSTRACT

An optical coupler at an edge of a photonic integrated circuit (PIC) is provided and configured to match a mode of a waveguide of the PIC to a mode of an external optical fiber. A core of the waveguide terminates prior to the edge and can include an inverted taper for mode enlargement. The waveguide cladding includes an inverted taper and is surrounded by an outer cladding material of lower refractive index, forming a second waveguide. The cladding and outer cladding cooperate to guide light between the core and the edge while the inverted taper contributes to mode enlargement. The outer cladding material is selected to have a refractive index which facilitates the mode matching to optical fiber. The coupler can be provided using lithography. Material underneath the waveguide cladding can be removed by an undercutting process and the outer cladding material deposited in place thereof.

29 Claims, 12 Drawing Sheets

(56) References Cited

U.S. PATENT DOCUMENTS

2013/0156370 A1     6/2013   Kim et al.

OTHER PUBLICATIONS

Fang et al., "Suspended optical fiber-to-waveguide mode size converter for Silicon photonics", Opt. Epr. vol. 18 (8), pp. 7763-7769, Apr. 12, 2010.

Barwicz et al., "An O-band Metamaterial Converter Interfacing Standard Optical Fibers to Silicon Nanophotonic Waveguides," OFC 2015.

Soganci, et al., "Flip-chip optical couplers with scalable I/O count for silicon photonics," Optics Express, vol. 21(13), 16075-16085, Jul. 1, 2013.

Barwicz, et al.,"Optical Demonstration of a Compliant Polymer Interface between Standard fibers and Nanophotonic Waveguides," OFC 2015.

Papes et al., "Fiber-chip edge coupler with large mode size for silicon photonic wire waveguides," Optics Express, vol. 24(5) 5027-5038, Mar. 7, 2016.

Lindenmann et al., "Connecting silicon photonic Circuits to multi-core fibers by photonic wire bonding," JLT, 20 vol. 33 (4), 755-760, 2014.

McNab et al., "Ultra-low loss photonic integrated circuit with membrane-type photonic crystal waveguides", Optics Express vol. 11(22), p. 2927-2939, Oct. 25, 2003.

http://www.plcconnections.com/silicon.html (May 1, 2015).

Dai, et al.,"Bilevel Mode Converter Between a Silicon Nanowire Waveguide and a Larger Waveguide", Journal of Lightwave Technology, vol. 24(6), p. 2428, Jun. 2006.

Barkai et al., "Double-stage Taper for coupling between SOI waveguides and single mode fiber", JLT, vol. 26(24), p. 3860, Dec. 15, 2008.

International Search Report dated Mar. 14, 2018 for corresponding International Application No. PCT/CN2017/116957 filed Dec. 18, 2017.

\* cited by examiner

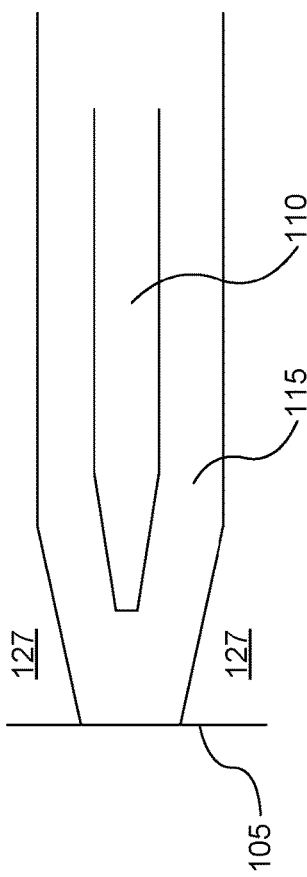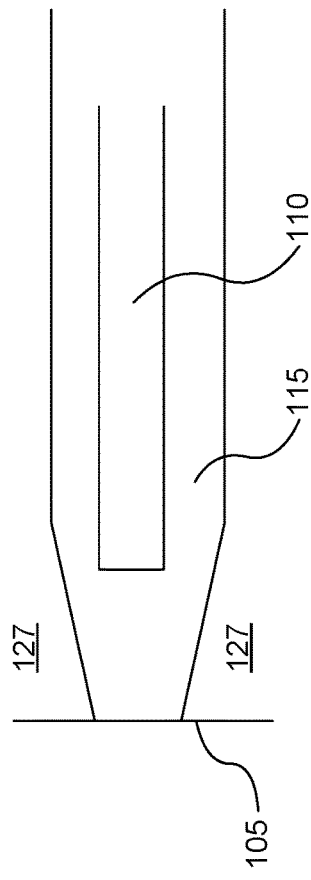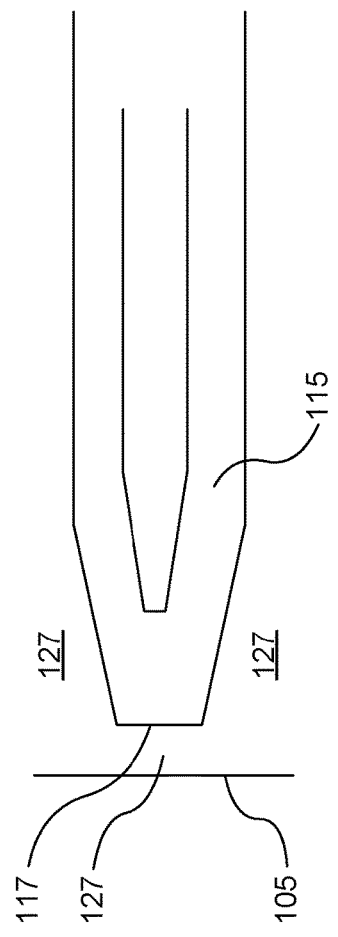

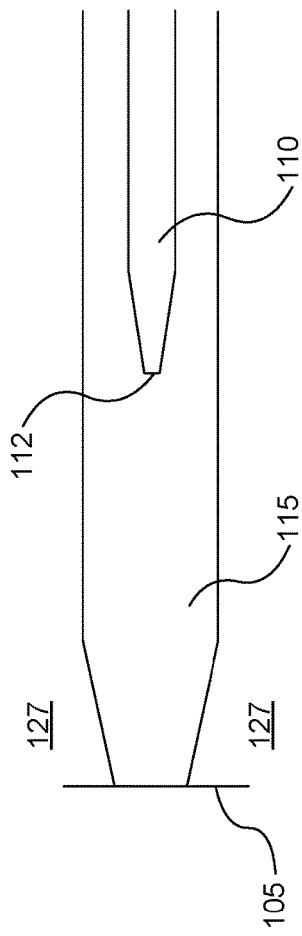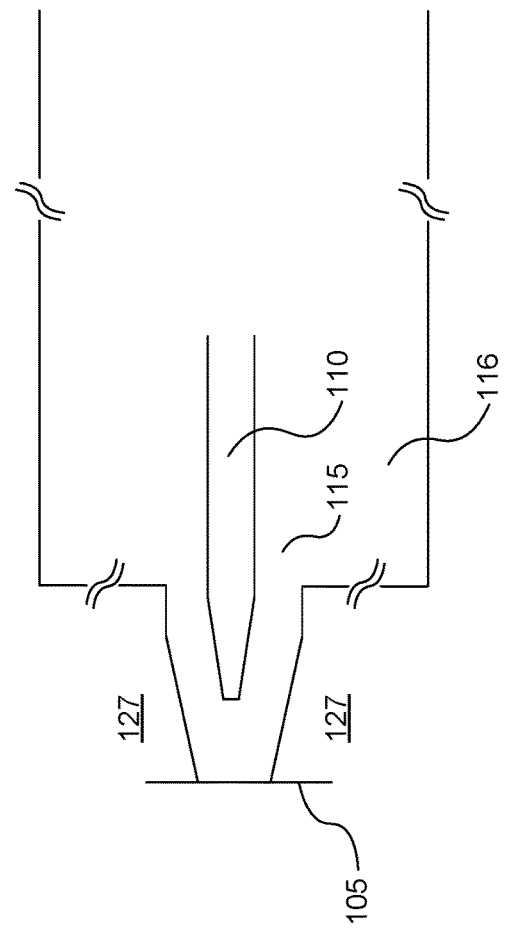

OPTICAL EDGE COUPLER WITH CONTROLLABLE MODE FIELD FOR PHOTONIC CHIP

FIELD

The present invention pertains to the field of optical signal transmission and in particular to an optical coupler for use at the boundary of a photonic chip, for example for coupling an optical fiber to the photonic chip.

BACKGROUND

Silicon-on-insulator (SOI) technology is attractive for photonic integrated circuit (PIC) implementations. SOI technology provides a high index contrast, can incorporate nano-scale waveguides, and can achieve a small device footprint, leading to dense integration of optical and electronic devices on a small chip. SOI applications include numerous active components such as optical modulators, switches, sensors and passive devices such as power splitters, interferometers, attenuators etc. Such applications often require the silicon chip to connect to an external optical fiber to transmit optical signals from the chip, or to receive optical signals to the chip.

Edge coupling is a standard approach to realize the optical fiber-to-photonic chip coupling. This approach works over a broad wavelength range, can achieve polarization insensitive coupling (e.g. coupling both TE/TM modes), and is compatible with mature package technology for larger photonic chip such as silica-on-silicon technology.

The current commercial standard optical fiber has a relatively large core in comparison to a typical on-chip silicon waveguide, resulting in a larger optical mode field than the mode associated with the silicon waveguide of a typical silicon chip. For example, the optical fiber mode in some typical cases can be 10 micrometers in diameter, while the silicon waveguide mode can be 0.5 micrometers in diameter. Direct connection between optical fiber and chip would typically result in a high optical signal loss, due to this mode size mismatch. A mode conversion is therefore desirable in order to reduce optical coupling losses. An efficient optical coupling can be achieved by closely matching the mode sizes between the optical fiber and the silicon waveguide.

Prior approaches to optimizing the optical coupling between fiber and chip include in-plane inverted silicon taper coupling, for example as described in C, Kopp, et al, "Silicon Photonic Circuits: On-CMOS Integration: Fiber Optical Coupling, and Packaging", IEEE Journal of Selected Topics in Quantum Electronics, Vol. 17, No. 3, May/Jun. 2011, Q. Fang, et al. "Suspended optical fiber-to-waveguide mode size converter for Silicon photonics", Opt. Epr. Vol. 18 (8), pp 7763-7769, 2010, and Tymon Barwicz et al., "An O-band Metamaterial Converter Interfacing Standard Optical Fibers to Silicon Nanophotonic Waveguides," Th3F3, OFC, 2015. Another approach is evanescent mode coupling, for example as described in I. Soganci, et al., "Flip-chip optical couplers with scalable I/O count for silicon photonics," Optics Express, Vol. 21(13), 16075-16085, 2013, T. Barwicz, et al. "Optical Demonstration of a Compliant Polymer Interface between Standard fibers and Nanophotonic Waveguides," OFC2015, and M. Papes, et al., "Fiber-chip edge coupler with large mode size for silicon photonic wire waveguides," Optics Express, Vol. 24(5) 5027-5038, 2016. Yet another approach is mode and pitch conversion interposing, for example as described at http://www.plcco-nnections.com/silicon.html. Yet another approach is chip-fiber wire bonding, for example as described in N. Lindenmann, et al, "Connecting silicon photonic Circuits to multi-core fibers by photonic wire bonding," JLT, Vol. 33(4), 755-760, 2015.

However, the above approaches can have certain drawbacks. For example, the in-plane inverted coupler implemented simply using chip top and bottom layers as cladding exhibits limited mode enlargement and suffers from loss due to leakage of the enlarged mode into the higher index substrate. The coupling efficiency of the evanescent mode coupler is sensitive to manufacturing variability. The mode conversion interposer is a transiting chip between the fiber and silicon chip, which requires two couplings of the fiber-to-interposer and interposer-to-chip. This increases the alignment workload and suffers from double coupling loss.

Therefore, there is a need for an optical coupler that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the invention, there is provided an optical coupler for use at the boundary of a photonic chip, for example for coupling the photonic chip to an optical fiber. According to one embodiment, there is provided an apparatus for providing optical coupling at an edge, such as the edge of a chip and/or PIC. The apparatus includes a first elongate region formed of a first material, such as silicon, having a first refractive index; and a second elongate region formed of a second material, such as silica, having a second refractive index lower than the first refractive index. Part of the first elongate region may be the core of a main waveguide and part of the second elongate region may be the cladding of the main waveguide. In some but not necessarily all embodiments, the first elongate region is tapered toward the edge. The second elongate region is tapered toward the edge. The second elongate region, which may also include an untapered portion, surrounds at least a portion of the first elongate region. The apparatus further includes a third material, such as a polymer, having a third refractive index lower than the second refractive index. The third material at least partially surrounds the second elongate region. Part of the second elongate region, together with the cladding, may form a secondary waveguide. Tapering of the both first elongate region and the second elongate region may improve propagation efficiency and mode enlargement.

In some embodiments, the third material surrounds top and sides of the second elongate region, so that the secondary waveguide resembles a rib waveguide. In other embodiments, an undercut is formed under the second elongate region and filled with the third material, so that the secondary waveguide resembles a strip waveguide. The second elongate region may be supported by a bridge structure during the undercut process.

According to another embodiment, there is provided an optical coupler at an edge of a photonic integrated circuit. The optical coupler includes an optical waveguide having a core and a cladding. The core has a terminus located at a first distance from the edge, and the cladding has an inverted taper extending beyond the terminus of the core and toward the edge. The optical coupler further includes a material at least partially surrounding the inverted taper and having a refractive index which is lower than a refractive index of the cladding. In some embodiments, the core includes another inverted taper ending at the terminus.

According to another embodiment, there is provided an optical coupler at an edge of a photonic integrated circuit. The optical coupler includes an optical waveguide having a core and a cladding. The core includes an inverted taper ending at a terminus, which is located at a first distance from the edge. The cladding has another inverted taper which extends beyond the terminus of the core and toward the edge. The optical coupler further includes a material at least partially surrounding the inverted taper and having a refractive index which is lower than a refractive index of the cladding.

According to other embodiments, there is provided a photonic integrated circuit comprising the optical coupling apparatus as described herein.

BRIEF DESCRIPTION OF THE FIGURES

Further features and advantages will become apparent from the following detailed description, taken in combination with the appended drawings, in which:

FIGS. 2A to 2E schematically illustrate top cross-sectional views of different embodiments of an optical coupler apparatus provided according to the present invention.

DETAILED DESCRIPTION

Figure 1A:
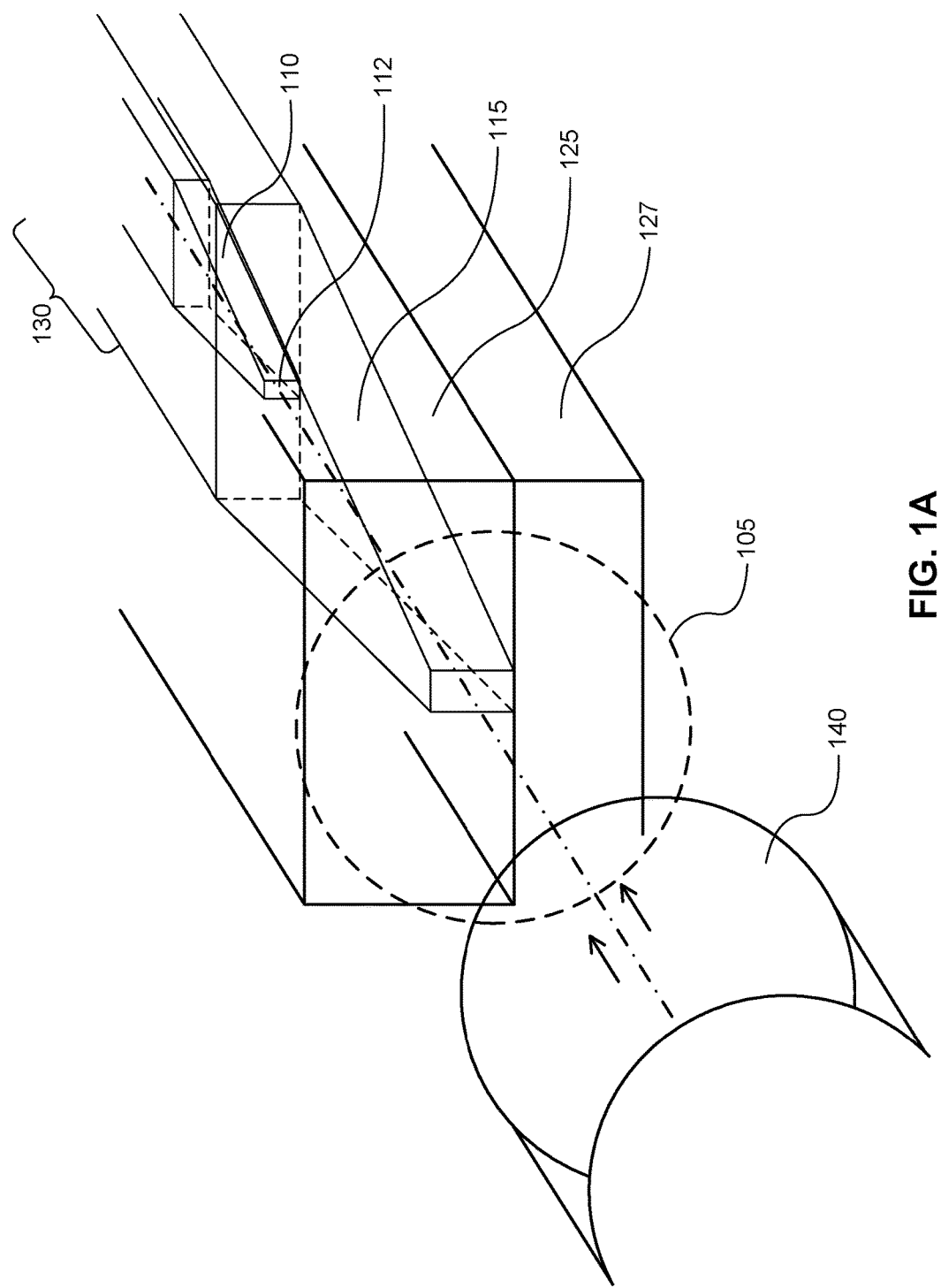
FIG. 1A illustrates an optical coupler apparatus according to an embodiment of the present invention.

The present invention provides an optical edge coupler and/or optical mode converter, in which the optical mode field dimension in the coupler is adjusted to match the mode of the coupled optical fiber, in order to provide an efficient optical coupling to control coupling losses associated with the edge coupler. Coupling losses between fiber and PIC chip can be limited, and coupling efficiency improved, by a chip edge structure which controls the mode field dimension using two inverted tapers in series and index contrast tailoring. The structure of the invention can also simplify the packaging process.

Embodiments of the present invention provide a double inverted taper structure covered with an outer cladding material which provides a selected index contrast, in order to provide for optical mode dimension matching with an external optical fiber. In more detail, embodiments of the present invention include an inverted silicon waveguide taper fabricated in the plane of a chip wafer. The inputs and/or outputs of silicon photonic (SiPh) devices on the chip are connected to the inverted silicon taper via a standard silicon waveguide in the chip. The silicon section taper tips towards and terminates a given distance from the chip edge. The silicon section narrows progressively toward its terminus, which is the taper tip. A silica (silicon dioxide) layer is deposited on the chip and also on the silicon taper, for example using a conventional silicon photonic (SiPh) nano-chip fabrication process. A second inverted taper is defined and patterned with the silica layer. The wide end of the silica taper and/or its connecting ridge part envelops the inverted silicon taper. The narrow end of the silica taper is towards or at the edge of the SiPh chip. A third layer of material, having a lower refractive index than the silica layer, is then deposited on the silica taper, thus providing an outer cladding layer. Silicon and silica are example materials; other optical materials can also be used.

The optical mode propagating in the silicon waveguide towards the edge is enlarged along the inverted silicon taper. At the end of the taper, the optical mode is then propagating completely in the silica waveguide. The optical mode is then further enlarged by the silica inverted taper located within the outer cladding layer.

By tuning the design of the silica taper tip width and/or height and the index contrast between the silica taper and the outer cladding, the optical mode dimension at the end of the second taper can be controlled. The dimension can thus be made to substantially improve the mode matching between the chip and fiber. An optical polymer having a configurable refractive index may be used as the outer cladding material. The refractive index may be configured by the composition of the polymer, for example. The polymer's refractive index may be selected to obtain a desired index contrast in relation to the silica taper, so that the mode field can be controlled to match that of a standard silica fiber. This produces a desirable mode overlap between the chip waveguide and the fiber.

In some embodiments, to further improve the coupling efficiency and mitigate leakage of the optical mode into the substrate, a deep etch and undercut process is applied to create a suspended bridge structure, in which material underneath the silica taper is removed but the silica taper is held in place using side bridges. The inverted taper fabrication and deep etch process can be effectively employed using standard fabrication techniques, such as CMOS fabrication techniques. The third, outer cladding material can then be disposed and filled into the region underneath the silica taper, such that the propagation of light can be better confined in the silica structure optical loss at the edge can be mitigated.

Figure 1B:
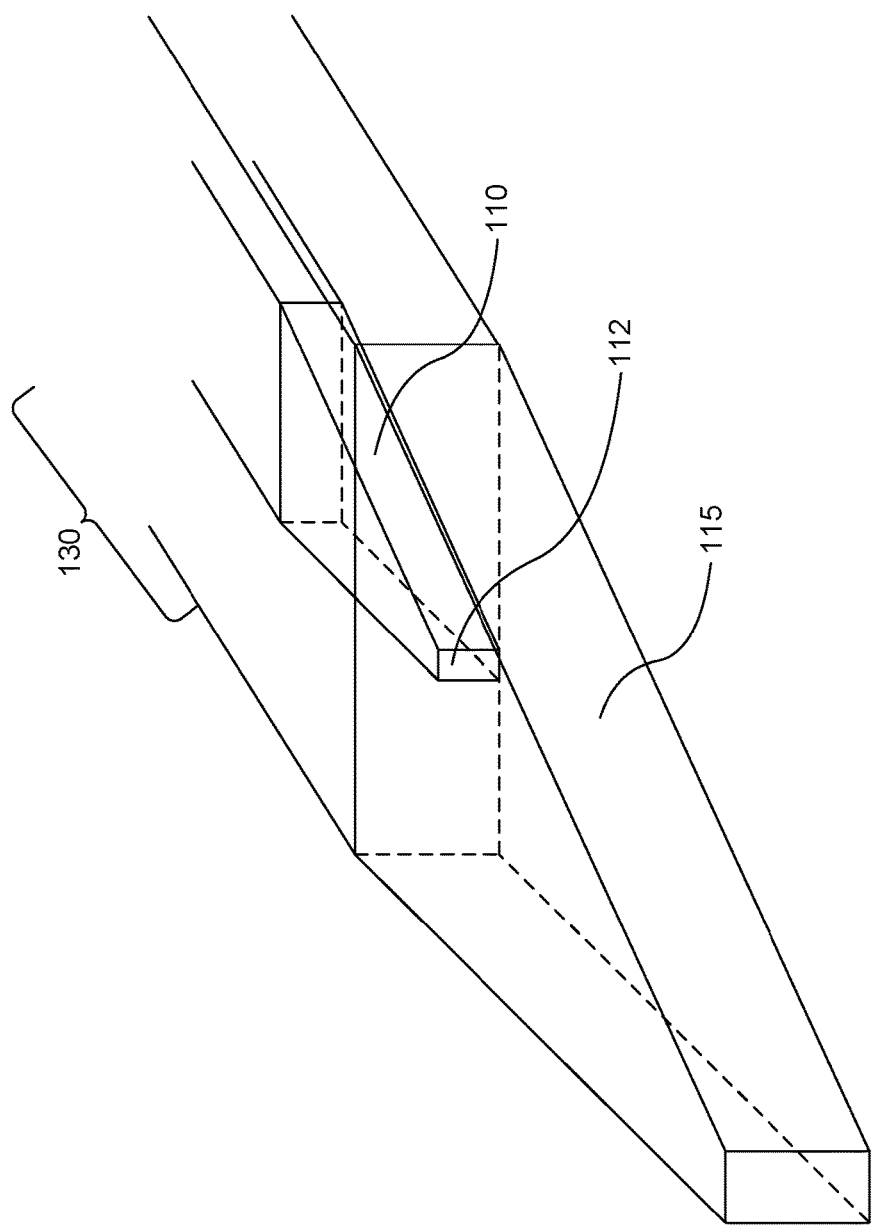
FIG. 1B illustrates an enlarged view of a portion of the apparatus of FIG. 1A.

Having reference now to FIGS. 1A and 1B, embodiments of the present invention provide for an apparatus, that is, an optical coupler, for providing optical coupling at an edge 105, such as an edge of a photonic integrated circuit (PIC) which is to be coupled to an external optical transmission line such as an optical fiber. FIG. 1B is a close-up view of a portion of FIG. 1A, and is provided for additional clarity. The apparatus includes a first elongate region 110 formed of a first material having a first refractive index. The first material may be silicon, for example. The apparatus further includes a second elongate region 115 formed of a second material. The second material has a second refractive index which is lower than the first refractive index. The second material may for example be silica, also referred to as silicon dioxide ($SiO_2$). The second elongate region 115 surrounds at least a portion of the first elongate region 110 to form a terminal part of a main optical waveguide, with the first elongate region 110 corresponding to the core of the main waveguide and the second elongate region 115 corresponding to the cladding of the main waveguide.

The second elongate region 115 (the cladding of the main waveguide) is tapered toward, i.e. narrows toward, the edge 105. This tapered portion acts as an optical inverted taper which contributes to optical mode enlargement as will be described in more detail below. For definiteness, it is noted that the second elongate region 115 becomes narrower in width (and optionally in height) as it approaches the edge 105. That is, a first part which is closer to the edge is narrower in cross section than a second part which is further form the edge 105. The tapering can be continuous based on mathematical functions such as linear, sinuous, parabolic, or elliptical functions, for example. The tapering can exhibit a variety of continuous curvatures.

The first elongate region 110, that is the core of the main waveguide, has a terminus 112 located at a first distance from the edge 105. The second elongate region 115 (the cladding of the main waveguide) extends beyond the terminus 112 of the core and toward the edge 105. The second elongate region 115 substantially encloses (envelops) the first elongate region 110, and, for each given distance from the edge 105, the second elongate region 115 has a wider cross-sectional area than the first elongate region 110. Further, the second elongate region 115 is formed of a continuous region of material, such as silica.

As also illustrated in FIGS. 1A and 1B, the first elongate region 110, i.e. the core of the main waveguide, is tapered toward the edge 105. As such, the first elongate region 110 in the illustrated embodiment also includes an inverted taper. This inverted taper also contributes to optical mode enlargement as will be described in more detail below. However, it is noted that this tapering of the first elongate region 110 can be omitted in some embodiments. For example, the first elongate region 110 can terminate in a non-tapered, for example square-ended, manner.

Referring to FIG. 1A, a third material 125, which has a third refractive index lower than the second refractive index, is also provided. In particular, the third material 125 at least partially surrounds the tapered portion of the second elongate region 115. The third material 125 forms an outer cladding which cooperates with the tapered second elongate region 115 as a secondary waveguide between the edge 105 and the main waveguide. In the secondary waveguide, the core is formed from the second elongate region 115 whereas the cladding is formed of the third material 125. As such, the second elongate region 115 forms not only the cladding of the main waveguide but also the core of the secondary waveguide.

In some embodiments, a region 127 below the second elongate region 115 may also be formed of the third material. In this case, the third material completely surrounds the second elongate region 115, i.e. the third material is adjacent to top, bottom and opposing side faces of the tapered portion of the second elongate region 115. In this configuration, the secondary waveguide resembles a strip waveguide with a tapered core. A strip waveguide includes a core, for example having a rectangular cross section, located between cladding layers or within a surrounding cladding.

In other embodiments, the region 127 may be formed of the second material. As such, the second elongate region 115 is adjacent along one face to the region 127, which is an elongate base region. In this case, the third material is adjacent to two opposing faces of the second elongate region, as well as being adjacent to a third face of the second elongate region connecting the two opposing faces. In this configuration, the secondary waveguide resembles a rib waveguide. The core of the rib waveguide includes a base and a ridge, the ridge being surrounded on three sides by the third material. The base is a slab of material having a first width, and the ridge is a strip of the same material which is integral with the base and protrudes upward or downward from the base, for example from the central region of the base. The cross section of the core of the rib waveguide may form an inverted "T" shape.

The refractive index of the third material is selected based at least in part on the desired diameter of the mode at the edge. The desired mode diameter is, for example set to closely match with the mode diameter inherent to the optical fiber being coupled to the edge. A close match is generally regarded to result in a more efficient coupling and reduced coupling losses. The mode diameter near the edge depends in part on the index contrast between the second material and the third material (of the secondary waveguide). In particular, taking the index contrast to be the difference between the refractive index of the second material and the refractive index of the third material, the mode diameter is generally a decreasing function of the index contrast. That is, at least under other nominal conditions, as the index contrast decreases, the mode diameter increases.

The third material may be, for example, polymer, sol-gel organic-inorganic hybrid material, or phosphorus boron doped silica. The refractive index may be configured, by doping and/or by selection of the polymer, to have a desired refractive index, such as a refractive index which is adequately close to and smaller than that of the second material. The third material may thus be an index tailorable material, used as an outer (e.g. top and/or lower) cladding for the secondary waveguide. Polymer is recognized to be a widely index selectable material, and the refractive index of the material can be selected so as to control the optical mode size in the secondary waveguide, so as to match the optical mode size to that of the mating optical fiber.

The combination of the taper dimensions and the refractive index contrast between the third material and the second material can thus be selected in order to create the desired optical mode size. The dimensions and refractive index can be determined using simulation, mathematical models, heuristic rules, experimentation, or a combination thereof, as would be readily understood by a worker skilled in the art.

FIGS. 1A and 1B also illustrate the connection of the optical coupler apparatus to a waveguide 130 of the photonic integrated circuit, as well as an optical fiber 140 which is to be placed adjacent to the edge 105. The waveguide 130 may be operatively coupled to one or more silicon devices of a photonic integrated circuit which also comprises the edge coupler apparatus. The waveguide 130 may be a silicon waveguide with a planar silica cladding covering a chip in which the waveguide is formed. The waveguide 130 may be a single mode strip waveguide, a single mode rib waveguide, or a multimode rib waveguide, for example. The optical fiber 140 may be unlensed. The optical fiber 140 may alternatively be lensed, for example in order to more closely align the optical path between the fiber and the chip edge.

Figure 3A:
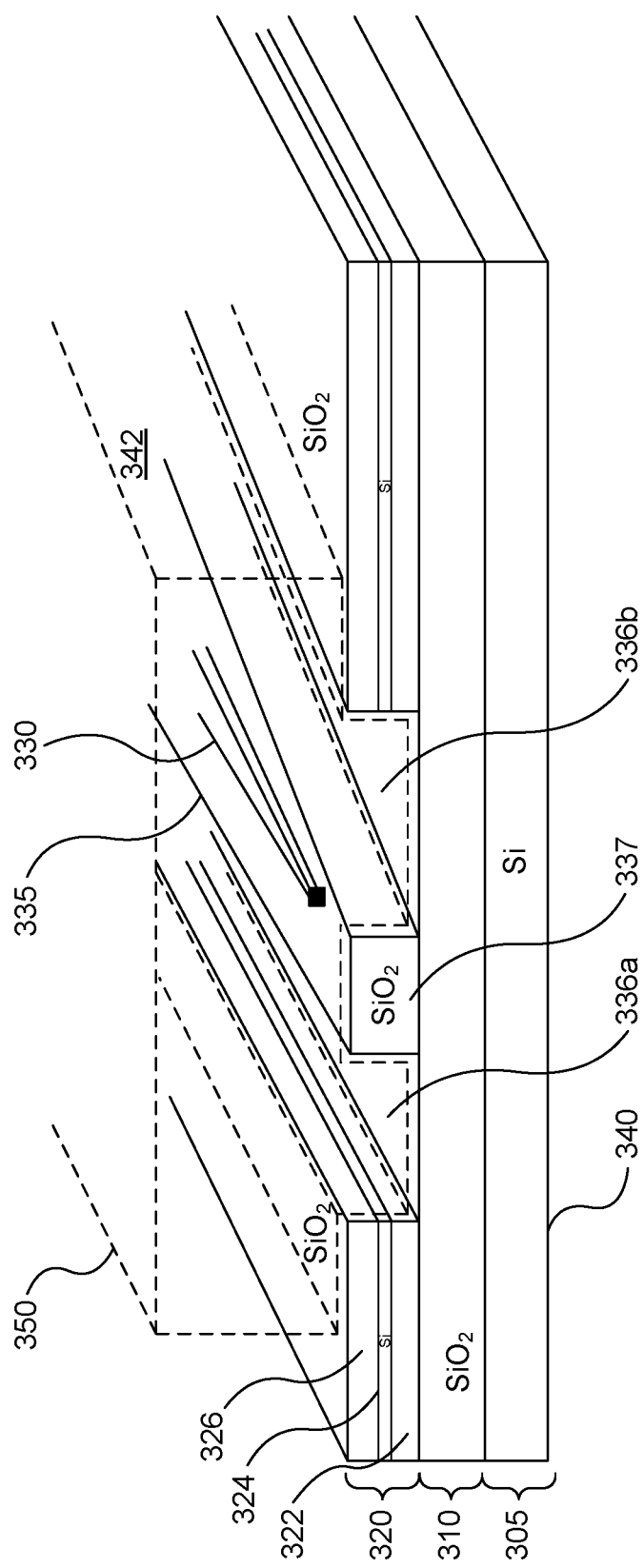
FIG. 3A illustrates a perspective view of an optical coupler apparatus according to an embodiment of the present invention.

It is noted that, in FIGS. 1A and 1B, the tapering of the second elongate region 115 appears to begin approximately at the point where the first elongate region 110 terminates. However, this is not to be taken as limiting on the present invention as the tapering of the first and second elongate regions can occur concurrently, for example as illustrated in FIG. 3A. Further, although the illustrated tapers are truncated so that their terminus is rectangular, they can alternatively be narrowed to a substantially pointed-tip terminus, to the extent the manufacturing methods in use can achieve such a terminus. The width of the terminus of each taper is equal to or larger than a minimum width achievable by the fabrication process being used. The taper should be shaped, including the terminal width thereof, to provide an adequately efficient and effective mode enlargement. Moreover, the various features illustrated in FIGS. 1A and 1B are intended to show general configurations only and are not necessarily to scale.

Mode enlargement using an inverted taper can be understood for example with reference to S. J. McNab, N. Moll and Y. Vlasov, "Ultra-low loss photonic integrated circuit with membrane-type photonic crystal waveguides", Optics Express 11, 22, p. 2927-2939 (2003). The taper narrows in the same direction in which the mode is desired to be enlarged. In the present case, the taper becomes narrower as the tapered component approaches the edge (e.g. of the PIC). As a tapered core narrows, the optical mode transitions from being confined to the core to being confined to the cladding region surrounding the core. This results in optical mode enlargement as the cladding-formed second waveguide has a larger cross section than the core. In the present invention, two tapers are provided, thereby providing for two stages of optical mode enlargement. Further, in various embodiments of the present invention, the effective index at the taper tip of the first elongate region is close to or equal to the index of the surrounding second elongate region formed of the second material.

As such, the optical mode propagating in the main (e.g. silicon-core) waveguide is enlarged as it traverses along the first inverted taper. At the end of the taper, the optical mode is then propagating mostly or substantially completely in the secondary (e.g. silica-core) waveguide, and is further enlarged as it traverses along the second inverted taper. By tuning the design of the second inverted taper's tip width and the index contrast between the second and third materials, the optical mode dimension at the end of the second inverted taper can be tuned so as to provide for close mode matching between the chip and external optical fiber.

FIGS. 2A to 2E schematically illustrate top cross-sectional views of the edge coupler apparatus according to various embodiments of the present invention. The illustrations are not necessarily to scale. FIG. 2A illustrates a similar configuration to that of FIGS. 1A and 1B, in which the first elongate region 110 is tapered toward the edge 105, the second elongate region 115 is tapered toward the edge 105, and the second elongate region 115 terminates at the edge 105. Regions of the third material 127 surrounding the second elongate region are also shown.

FIG. 2B illustrates an alternative configuration, in which the first elongate region 110 terminates in a square edge and the second elongate region 115 is tapered toward the edge 105. The square edge is prone to back-reflection may result in a higher transition loss than a tapered tip. Regions of the third material 127 surrounding the second elongate region are also shown. Alternatively, the first elongate region can terminate in another shape, such as a forward taper which is tapered away from the edge 105.

FIG. 2C illustrate another alternative configuration, in which the second elongate region 115 ends at a terminus 117 which is spaced apart from the edge 105. Regions of the third material 127 surrounding the second elongate region and also located between the second elongate region 115 (i.e. the terminus 117 thereof) and the edge 105 are also shown. As such, the second elongate region is set back from the edge. Spacing of the terminus 117 away from the edge 105 may allow for further enlargement of the mode, for example due to propagation in the third material without ridge confinement, similar to free space transmission. However, in typical implementations, the spacing between the terminus 117 and the edge 105 may be limited to avoid high optical attenuation.

FIG. 2D illustrates a configuration in which the first elongate region 110 and the inverted taper thereof are both contained within a non-tapered portion of the second elongate region 115. In other words, the beginning of the inverted taper of the second elongate region 115 is located between the edge 105 and a terminus 112.

FIG. 2E illustrates a configuration in which a cladding 116 which includes the second elongate region 115 is extended to cover some or the entire chip on which the optical coupling apparatus and associated components are disposed. The boundary between the second elongate region and the remaining cladding is therefore obscured. From another perspective, the second elongate region 115 is widened to cover part or the entire chip, and is therefore not necessarily "elongate" in shape.

The different options illustrated in FIGS. 2A to 2E can be combined, to the extent that they provide an operable embodiment and are not mutually exclusive.

FIG. 3A illustrates a perspective (not to scale) view of an embodiment of the present invention, implemented using a multi-layer, e.g. lithographic and cutaway approach. The illustrated structure includes a substrate layer 305 of silicon (Si), a silica layer 310 disposed on top of the substrate layer 305, and a further layer 320 disposed on top of the silica layer 310. The further layer 320 includes silicon 324 interposed between lower 322 and upper 326 regions of silica. The silicon 324 and silica 322, 326 may be provided as separate layers which are patterned during manufacture. A silicon inverted taper 330 is provided in the silicon 324 as a first elongate region. The silicon inverted taper 330 is surrounded by a silica inverted taper 335, which is provided as a second elongate region in the silica 322, 326. The silica taper 335 may be patterned with the outer cladding on the silicon waveguides. Both the silicon inverted taper 330 and the silica inverted taper 335 are tapered toward an edge 340. The silica inverted taper 335 terminates at a tip 337 which is coplanar with or proximate to the edge 340. At the ends of the inverted tapers 330, 335 which are opposite the edge 340 (generally in the vicinity of reference location 342), the silicon and silica tapers connect to core and cladding, respectively, of a standard silicon waveguide. The silicon waveguide may be a routing waveguide connecting to silicon devices on the PIC.

A third material 350, which functions as an outer cladding, may be disposed overtop of the structure, for example after the other features are defined in a series of lithographic manufacturing steps. A possible boundary of the third material 350 is shown using dashed lines in FIG. 3A. Alternatively, the third material 350 may cover up to the entirety of the chip. The third material 350 may be a polymer with a selected refractive index. The index contrast between the second and third materials is selected to produce a desired mode field size for matching to a mating optical fiber or other device.

Because the silica inverted taper 335 is adjacent on one face to another silica region, the silica inverted taper 335 and third material 350 resemble a rib waveguide.

In one embodiment, the silica inverted taper 335 may be defined by etching two shaped regions 336a, 336b on either side of the taper 335, as shown.

In one embodiment, the tip (terminus) of the silica taper is 2 micrometers wide by 2 micrometers high. In some embodiments, the silicon and silica tapers are each, for example, at least about 200 micrometers long. In other embodiments, one or both of the silicon and silica tapers are shorter than 200 micrometers.

Figure 3B:
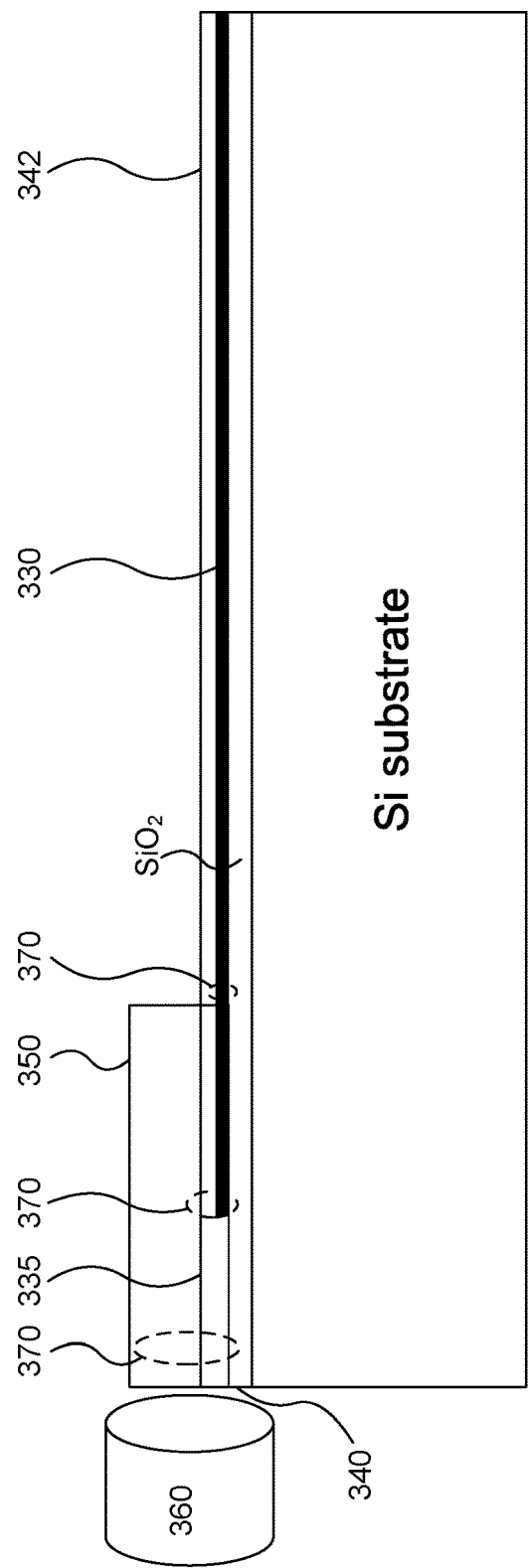
FIG. 3B schematically illustrates a side view of the embodiment of FIG. 3A.

FIG. 3B schematically illustrates a side view of the embodiment of FIG. 3A. An optical fiber 360 coupled to the edge is also shown. Rings 370 illustrate progressive enlargement of the optical mode along the length of the coupler.

Figure 4A:
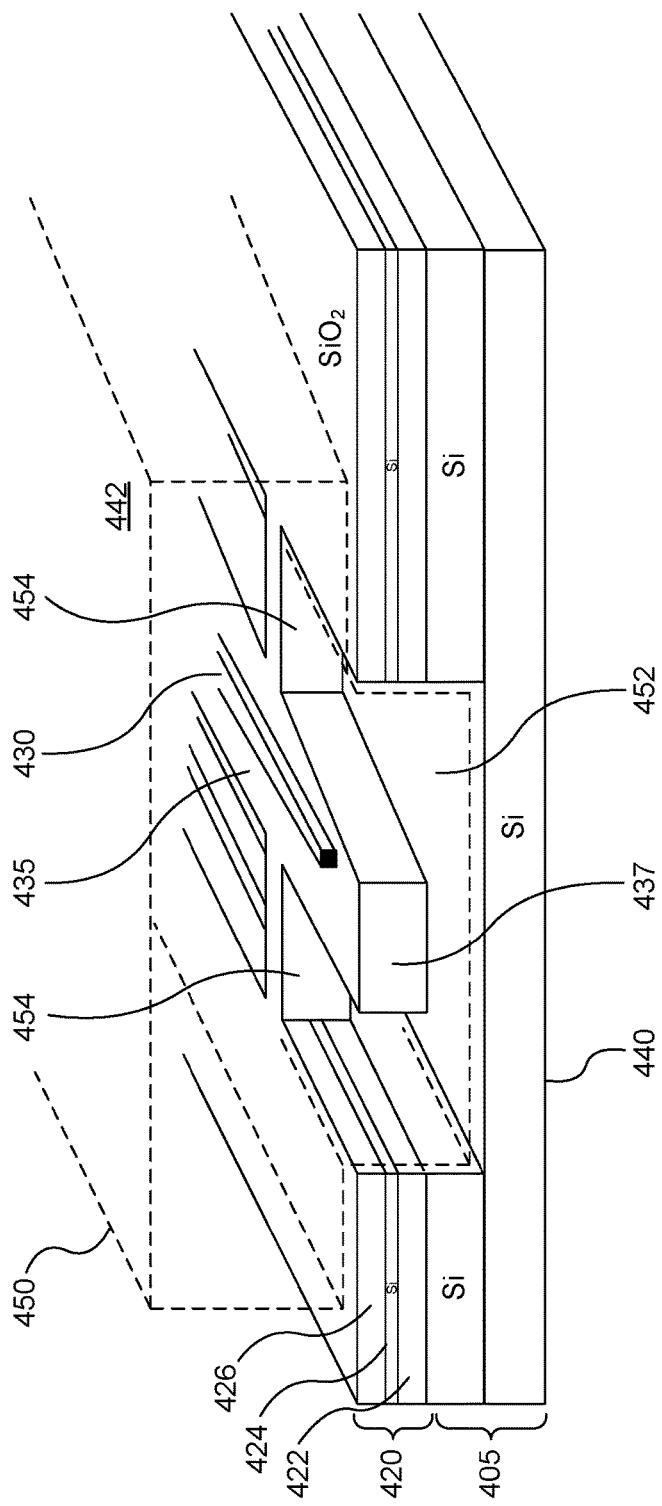
FIG. 4A illustrates a perspective view of an optical coupler apparatus according to another embodiment of the present invention.

FIG. 4A illustrates a perspective (not to scale) view of another embodiment of the present invention, implemented using a multi-layer, e.g. lithographic and cutaway approach. The illustrated structure includes a substrate layer 405 of silicon (Si), and a further layer 420 disposed on top of the substrate layer 405. The further layer 420 includes silicon 424 interposed between lower 422 and upper 426 regions of silica. The silicon 424 and silica 422, 426 may be provided as separate layers which are patterned during manufacture. A silicon inverted taper 430 is provided as a first elongate region in the silicon 424. The silicon inverted taper 430 is surrounded by a silica inverted taper 435 in the silica 422, 426, which is provided as a second elongate region. Both the silicon inverted taper 430 and the silica inverted taper 435 are tapered toward the edge 440. Tip 437 of the silica inverted taper 435 is coplanar with an edge 440 or set back from but proximate to the edge 440. At the ends of the inverted tapers 430, 435 which are opposite the edge (generally in the vicinity of reference location 442), the silicon and silica tapers connect to core and cladding, respectively, of a standard silicon waveguide.

A third material 450, which functions as an outer cladding, may be disposed overtop of the structure and within an undercut 452, for example after the other features are defined in a series of lithographic and/or cutaway manufacturing steps. The undercut 452 corresponds to a region in which part of the substrate layer 405 is absent. A possible boundary of the third material 450 is partially shown using dashed lines in FIG. 4A. The third material 450 may be a polymer with a selected refractive index.

Because the silica inverted taper 435 is surrounded by the third material 450, the silica inverted taper 435 and third material 450 resemble a strip waveguide. The use of the undercut 452 filled with the third material 450 can enhance the confinement of the optical mode.

In some embodiments, the silica inverted taper 435 is initially formed adjacent to the substrate layer 405. A portion of the substrate layer 405 is subsequently removed to define a gap adjacent to the silica inverted taper 435. The third material is subsequently deposited into the gap.

The silica inverted taper 435 may be held in place by incomplete removal of the surrounding material. As illustrated, a pair of bridges 454 are formed in the further layer 420 and connect the silica inverted taper 435 to a support feature which is formed in the further layer 420 and is supported by the substrate layer 405. The bridges 454 support the silica inverted taper 435 upon removal of the portion of the substrate layer 405 to define the undercut 452. One of the bridges may optionally be omitted. Additional bridges can be added, for example in order to provide additional support for a long suspended ridge. Alternative support structures, such as one or more posts overtop or beneath the silica inverted taper 435 and connecting to another layer or structure above or below the taper may also be used. The number and type of supports can depend on the length of the suspended structure and the mechanical strength required to support same.

In some embodiments, a portion of the substrate layer 405 can be removed and filled with the third material prior to formation of the further layer 420 and the waveguide structure of same. Additional layers of the third material can then be formed overtop of the waveguide structure proximate to the edge.

Furthermore, in some embodiments, because the undercut 452 is filled with polymer or another material, this material protects the silica inverted taper 435 and potentially enhances the edge coupler's mechanical strength. This is particularly true when the polymer is a mechanically strong material.

In one embodiment, the tip (terminus) 437 of the silica taper is 2 micrometers wide by 4 micrometers high. The silicon and silica tapers may each be, for example, at least about 200 micrometers long. The tapers may alternatively be shorter than 200 micrometers.

Figure 4B:
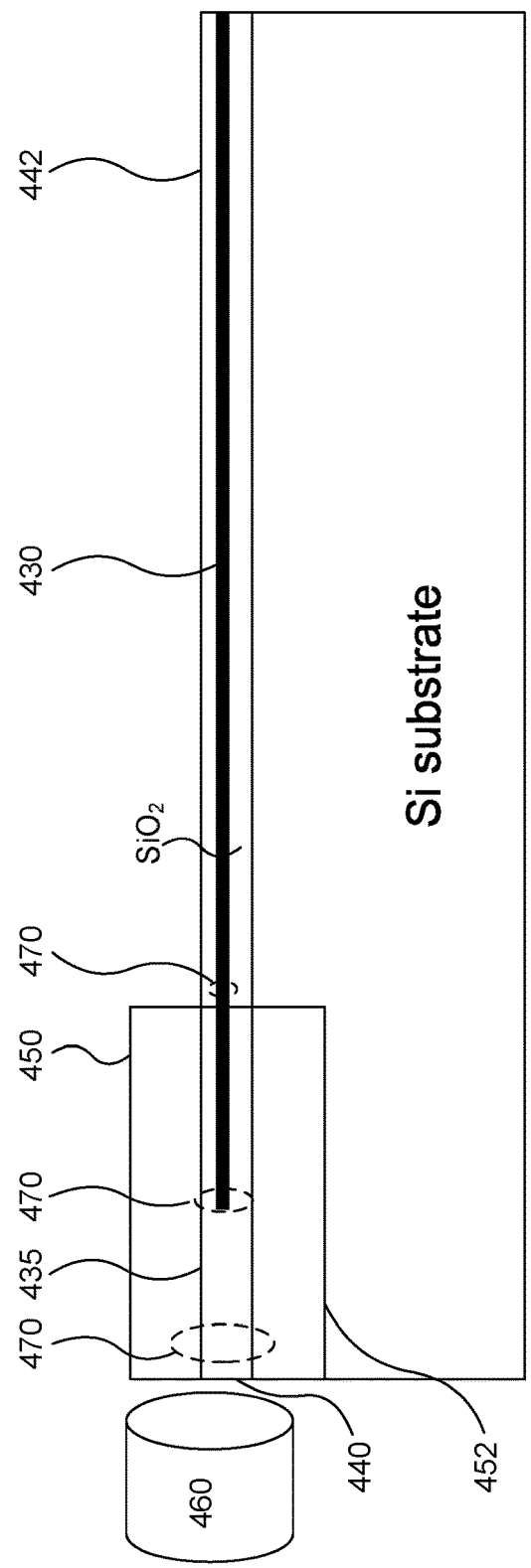
FIG. 4B schematically illustrates a side view of the embodiment of FIG. 4A.

FIG. 4B schematically illustrates a side view of the embodiment of FIG. 4A. An optical fiber 460 coupled to the edge is also shown. Rings 470 symbolically illustrate, by their location and diameter, progressive enlargement of the optical mode along the length of the coupler.

Figure 5:
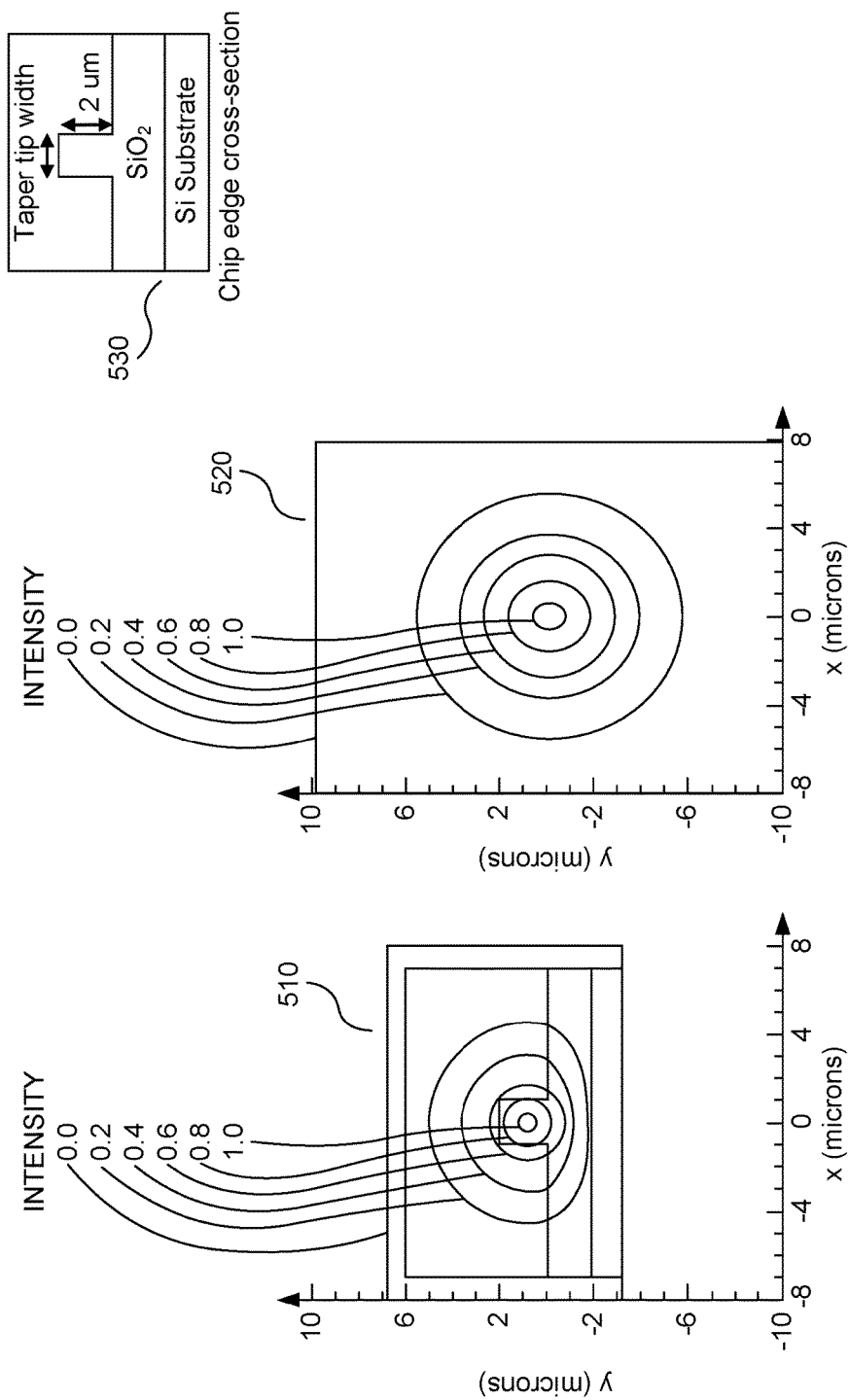
FIG. 5 illustrates simulated performance of an example embodiment of the present invention, of the type illustrated in FIG. 3A.

FIG. 5 illustrates simulated performance of an example embodiment of the present invention. The embodiment includes a silica rib taper tip of the type illustrated in FIG. 3A. The silica taper tip (second elongated region) has a cross section of 2 micrometers by 2 micrometers on a 2 micrometer-thick silica slab. The second elongated region is made of silica having a refractive index of 1.444. The third material surrounding the second elongated region has a refractive index of 1.435. First graph 510 of FIG. 5 shows the spatial mode intensity distribution proximate to the edge and within the silica rib taper. In this and similar graphs, each progressively inward concentric ring represents a higher intensity of the spatial mode. Second graph 520 of FIG. 5 shows the spatial mode intensity distribution within the optical fiber coupled to the edge. The coupling efficiency between fiber and waveguide is 93% (~0.8 dB), due to the relatively close mode matching. The mode diameter is approximately 10 micrometers. A cross section 530 of the apparatus near the chip edge is also shown.

Figure 6:
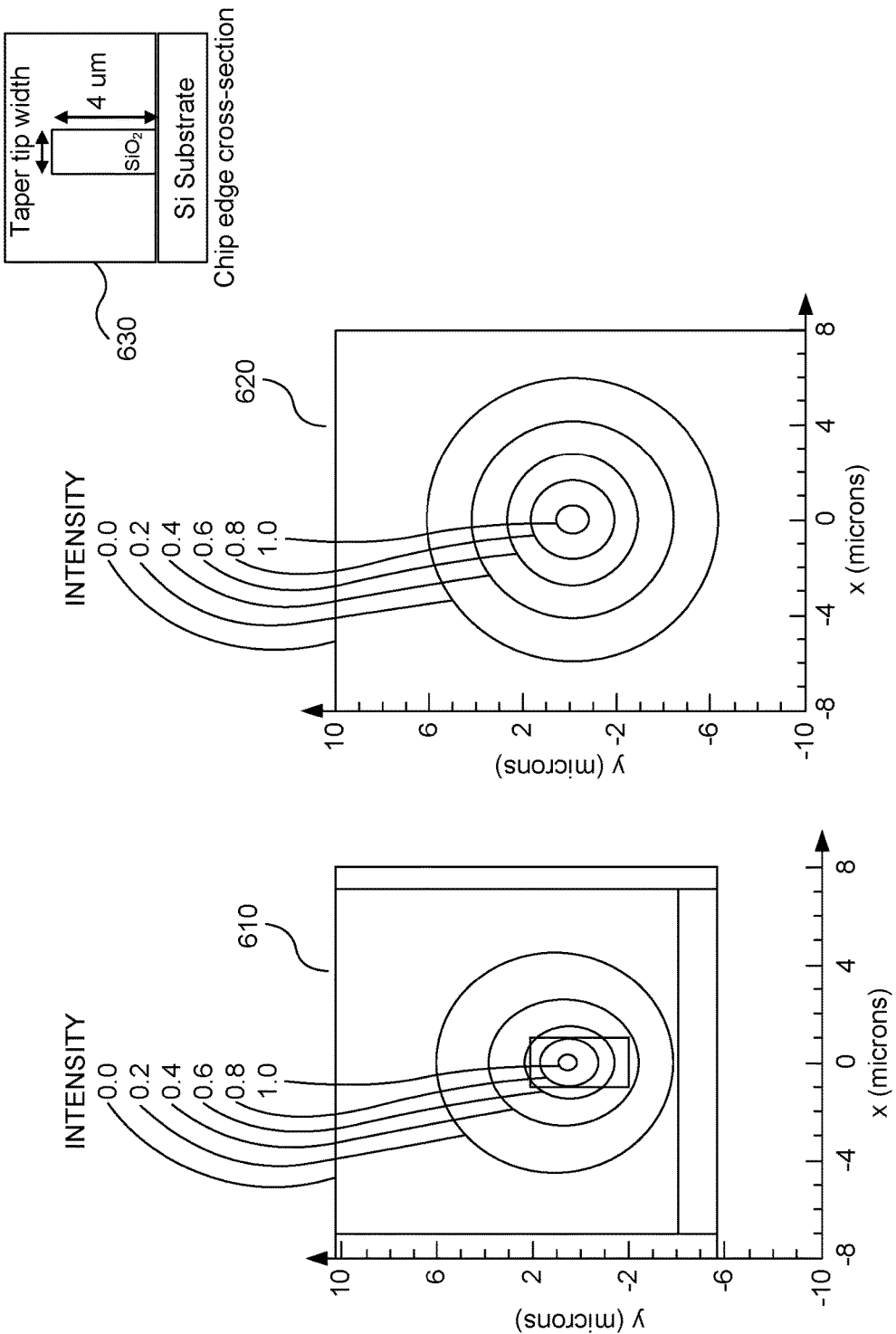
FIG. 6 illustrates simulated performance of an example embodiment of the present invention, of the type illustrated in FIG. 4A.

FIG. 6 illustrates simulated performance of an example embodiment of the present invention. The embodiment includes a silica strip taper tip of the type illustrated in FIG. 4A. The silica taper tip (second elongated region) has a cross section of 2 micrometers by 4 micrometers. The second elongated region is made of silica having a refractive index of 1.444. The third material surrounding the second elongated region has a refractive index of 1.435. First graph 610 of FIG. 6 shows the spatial mode intensity distribution proximate to the edge and within the silica strip taper. Second graph 620 of FIG. 6 shows the spatial mode intensity distribution within the optical fiber coupled to the edge. The coupling efficiency between fiber and waveguide is 95% (~0.4 dB), due to the relatively close mode matching. The mode diameter is approximately 10 micrometers. A cross section 630 of the apparatus near the chip edge is also shown.

Figure 7:
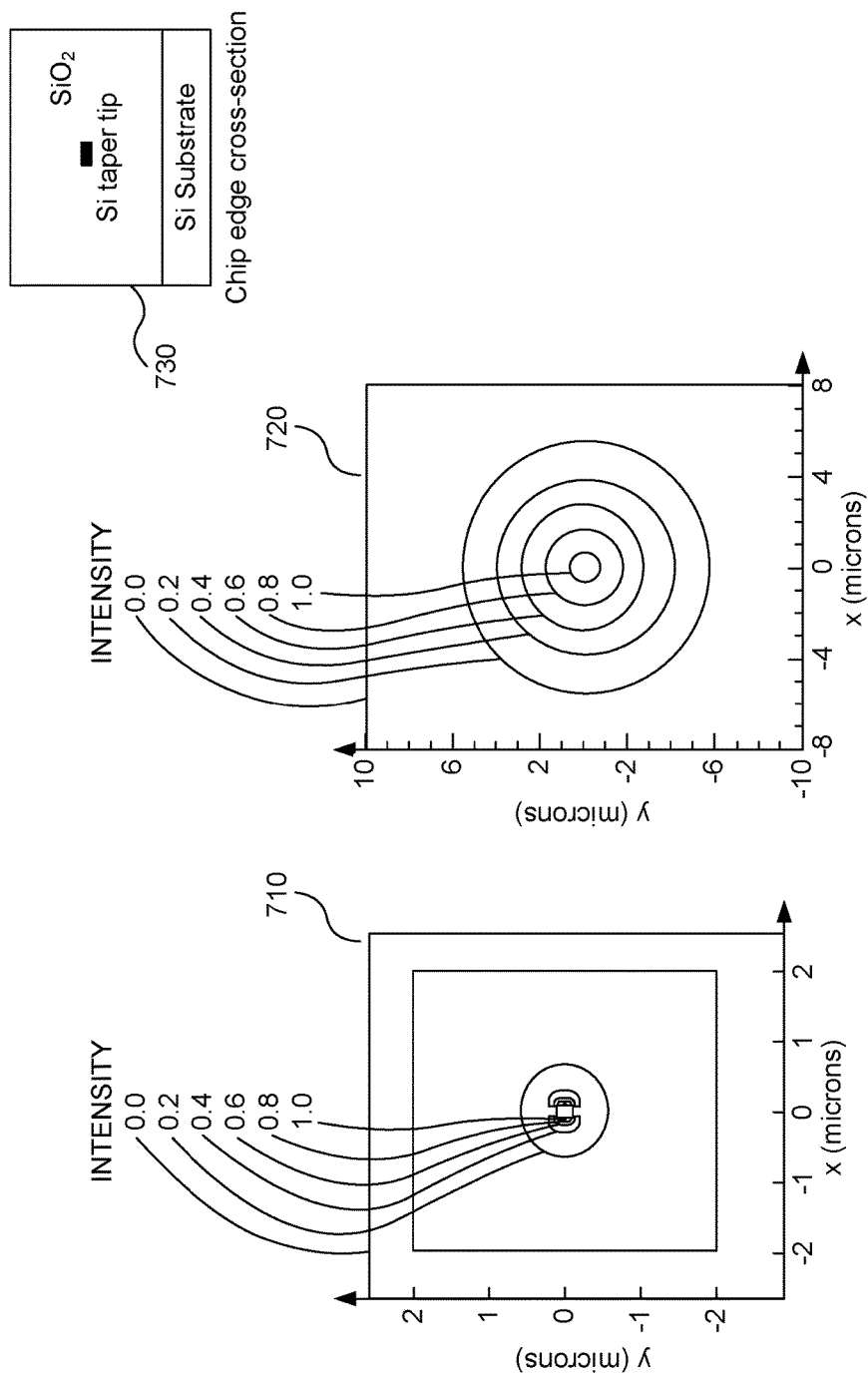
FIG. 7 illustrates simulated performance of a prior art optical coupler.

FIG. 7 illustrates simulated performance of a prior art optical coupler, for comparison purposes. The optical coupler includes a silicon taper within a silica cladding. Only a single taper is used, and the silicon taper tip is 0.18 micrometers by 0.22 micrometers. The refractive index of the silicon is 3.45 while the refractive index of the silica cladding is 1.444. The silicon tip is 1 micrometer away from the optical fiber. First graph 710 of FIG. 7 shows the spatial mode intensity distribution proximate to the edge and within the silicon taper. Second graph 720 of FIG. 7 shows the spatial mode intensity distribution within the optical fiber coupled to the edge. The coupling efficiency between fiber and waveguide is 31% (~5.1 dB). A cross section 730 of the apparatus near the chip edge is also shown.

Figure 8:
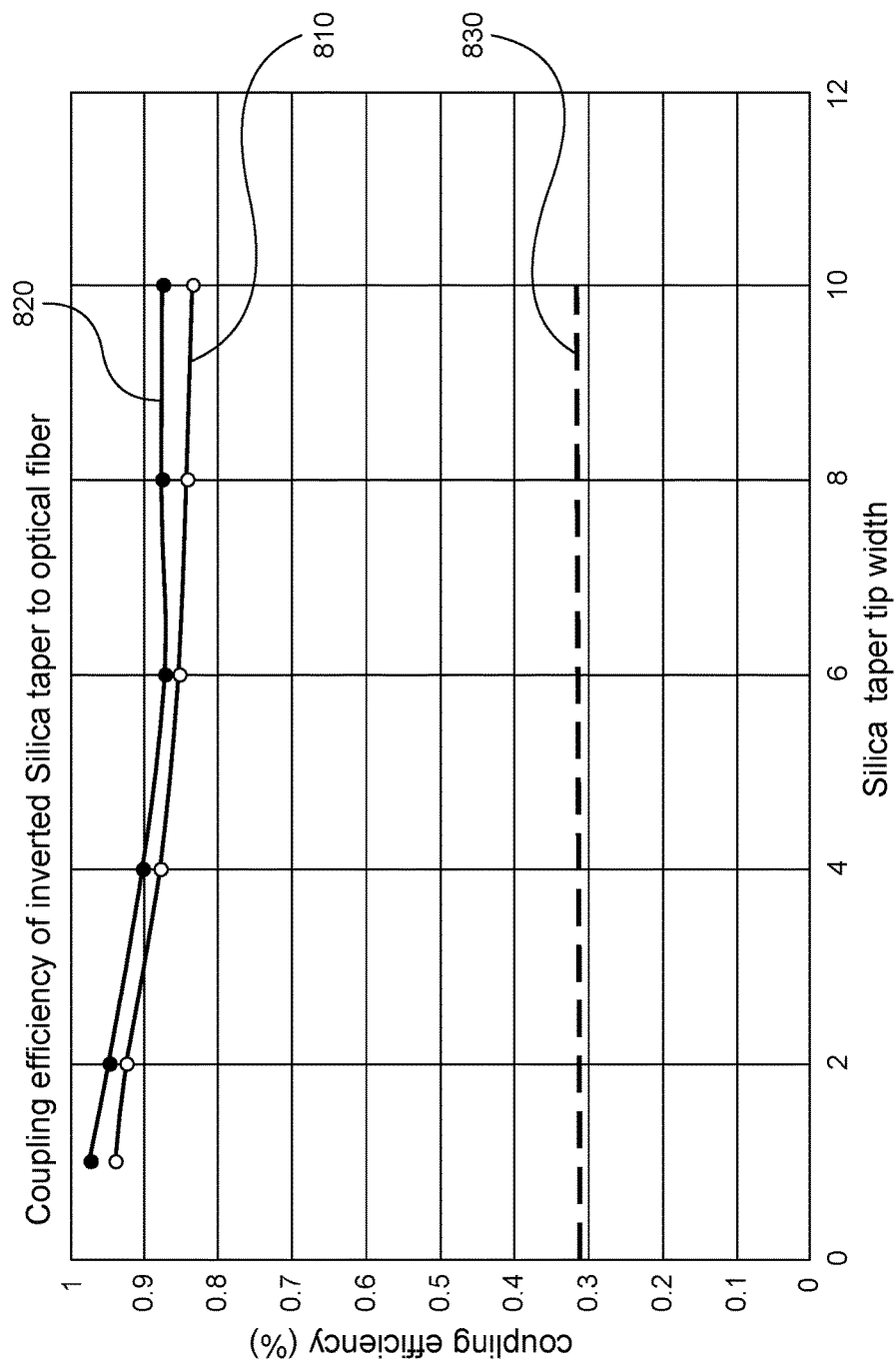
FIG. 8 graphically illustrates performance of the example embodiments as described with respect to FIGS. 5 and 6, and of the prior art optical coupler as described with respect to FIG. 7.

FIG. 8 graphically illustrates performance of the example embodiments as described with respect to FIGS. 5 and 6, and of the prior art optical coupler as described with respect to FIG. 7. The variation of the coupling efficiency with respect to the silica taper tip width is shown for the inverted silica rib taper case 810 (corresponding to FIG. 5) and for the inverted silica strip taper case 820 (corresponding to FIG. 6). The coupling efficiency of 31%, corresponding to the prior art single inverted silicon taper optical coupler corresponding to FIG. 7 is also shown at 830 for comparison.

According to embodiments of the present invention, the optical edge coupler provides for an in-plane coupling, such that the coupler is disposed within the same plane as the waveguide within the photonic integrated circuit.

Embodiments of the present invention may be used within silicon photonic (SiPh) chips that require the optical input and/or output interfaces between an optical fiber and the chip. This includes, for example, SiPh chips for metro optical core networks, wireless aggregation networks, and data center core switching networks. The coupling efficiency is desirably high, thereby improving link loss budget constraints.

Embodiments of the present invention provide an optical coupler which is operative in both TE and TM modes, over a potentially large bandwidth.

Embodiments of the present invention omit an evanescent structure of the two waveguide directional coupler, thereby allowing a relatively large tolerance for manufacturing fabrication variation in comparison with edge couplers which utilize an evanescent structure.

Although silicon and silica are used as primary examples of materials for use in fabricating the optical coupler disclosed herein, it is recognized that other suitable materials, such as Group III-IV-V materials, can alternatively be used, as would be readily understood by a worker skilled in the art. Potentially suitable materials include $Si_3N_4$, SiON, InP, GaInAs or GaInAsP.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope.

What is claimed is:

1. An apparatus for providing optical coupling between a photonic integrated circuit (PIC) and an external optical transmission line at an edge, the apparatus comprising:
   a first elongate region formed of a first material having a first refractive index, the first elongate region forming a core of a main portion of a waveguide;
   a second elongate region formed of a second material having a second refractive index lower than the first refractive index, the second elongate region decreased in dimension toward the edge, the second elongate region surrounding at least a portion of the first elongate region and forming a core of a secondary portion of the waveguide, the second elongate region configured to gradually adjust a diameter of a mode of light propagating in the secondary portion of the waveguide and within a region separate from the main portion of the waveguide; and
   a third material having a third refractive index lower than the second refractive index, the third material at least partially surrounding and adjacent to a portion of the second elongate region which extends beyond a terminus of the first elongate region, the third material forming a cladding of the secondary portion of the waveguide.

2. The apparatus of claim 1, wherein the first elongate region is decreased in dimension toward the edge.

3. The apparatus of claim 1, wherein the third material is adjacent to two opposing side faces of the portion of the second elongate region which extends beyond the terminus of the first elongate region.

4. The apparatus of claim 3, wherein the third material is adjacent to a top face of the second elongate region connecting the two opposing side faces.

5. The apparatus of claim 3, wherein a bottom face of the second elongate region is adjacent to an elongate base region formed of the second material.

6. The apparatus of claim 5, further comprising:
   a first further layer disposed on top of the elongate base region, the first further layer being proximate to one of the opposing side faces of the second elongate region by a first space; and
   a second further layer disposed on top of the elongate base region, the second further layer being proximate to the other of the opposing side faces of the second elongate region by a second space, wherein the third material at least partially surrounds the second elongate region, the first further layer and the second further layer and fills the first space and the second space.

7. The apparatus of claim 6, wherein each of the first further layer and the second further layer comprises a region made of the first material interposing between a lower region and an upper region, the lower region and the upper region being made of the second material.

8. The apparatus of claim 6, further comprising a substrate adjacent to the bottom of the elongate base region.

9. The apparatus of claim 8, wherein the substrate is made of the first material.

10. The apparatus of claim 1, wherein the third material is adjacent to top, bottom and opposing side faces of at least the portion of the second elongate region which extends beyond the terminus of the first elongate region.

11. The apparatus of claim 10, further comprising:
   a substrate having an undercut region, wherein the undercut region comprises:
      a first side surface proximate to one of the opposing side faces of the second elongate region by a first space;
      a second side surface proximate to the other of the opposing side faces of the second elongate region by a second space; and
      a bottom surface proximate to the bottom face of the second elongate region by a third space;
      a first further layer disposed on top of a substrate top surface along the first side surface of the undercut region; and a second further layer disposed on top of the substrate top surface along the second side surface of the undercut region, wherein at least one of the further layers being connected to the second elongate region by one or more bridges.

12. The apparatus of claim 11, wherein the third material at least partially surround the second elongate region, the first further layer and the second further layer, and fills the first space, the second space and the third space.

13. The apparatus of claim 11, wherein each of the first further layer and the second further layer comprises a region made of the first material interposing between a lower region and an upper region, the lower region and the upper region being made of the second material.

14. The apparatus of claim 11, wherein the substrate is made of the first material.

15. The apparatus of claim 1, wherein the second elongate region terminates at the edge.

16. The apparatus of claim 1, wherein a portion of the third material is located between the second elongate region and the edge and the portion of the third material is located along a main axis of the second elongate region.

17. The apparatus of claim 1, wherein the first material is silicon.

18. The apparatus of claim 1, wherein the second material is silica.

19. The apparatus of claim 1, wherein the third material is polymer, sol-gel organic-inorganic hybrid material, or phosphorous boron doped silica.

20. The apparatus of claim 1, wherein some or all of the first material, the second material, and the third material are Type III, Type IV or Type V materials.

21. The apparatus of claim 1, wherein the edge is an edge of the photonic integrated circuit.

22. The apparatus of claim 1, wherein the first elongate region and the second elongate region form an end of the waveguide operatively coupled to one or more devices of the photonic integrated circuit comprising the apparatus.

23. The apparatus of claim 1, wherein the waveguide is a single-mode strip waveguide, a single mode rib waveguide, or a multimode rib waveguide.

24. A photonic integrated circuit comprising the apparatus of claim 1.

25. The apparatus of claim 1, wherein the third material is adjacent to the portion of the second elongate region which extends beyond the terminus of the first elongate region.

26. An optical coupler at an edge of a photonic integrated circuit, comprising:
- an optical waveguide having a first core and a cladding, the first core comprising a terminus located at a first distance from the edge and the cladding comprising a first inverted taper, the first inverted taper extending beyond the terminus of the first core and decreasing in dimension toward the edge, wherein the extension of the first inverted taper forms a second core of the optical waveguide, and wherein the cladding is configured to gradually adjust a diameter of a mode of light propagating in the second core of the optical waveguide within a region separate from first core; and
- a material at least partially surrounding and adjacent to a portion of the first inverted taper which extends beyond the terminus of the first core, the material forming a cladding around the second core of the optical waveguide and having a refractive index which is lower than a refractive index of the cladding.

27. The optical coupler of claim 26, wherein the first core comprises a second inverted taper ending at the terminus, the second inverted taper decreasing in dimension toward the edge.

28. The optical coupler of claim 26, wherein the first inverted taper of the cladding forms a core of a rib waveguide having a base and a ridge, the ridge being surrounded by the material on a top face and two opposing side faces.

29. The optical coupler of claim 26, wherein the first inverted taper of the cladding forms a core of a strip waveguide, the material surrounding and adjacent to the core of the strip waveguide.

* * * * *